United States Patent
Lee et al.

(10) Patent No.: US 11,733,702 B2
(45) Date of Patent: Aug. 22, 2023

(54) UNMANNED FOLLOWING VEHICLE

(71) Applicant: HANWHA AEROSPACE CO., LTD., Changwon-si (KR)

(72) Inventors: Yun Su Lee, Changwon-si (KR); Hyun Jin Kim, Changwon-si (KR); Chul Hee Han, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 263 days.

(21) Appl. No.: 17/169,723

(22) Filed: Feb. 8, 2021

(65) Prior Publication Data
US 2022/0137629 A1   May 5, 2022

(30) Foreign Application Priority Data
Oct. 30, 2020   (KR) .......................... 10-2020-0143868

(51) Int. Cl.
*G05D 1/02*   (2020.01)
*G05D 1/00*   (2006.01)
(Continued)

(52) U.S. Cl.
CPC ......... *G05D 1/0214* (2013.01); *B62D 15/021* (2013.01); *F41H 7/005* (2013.01);
(Continued)

(58) Field of Classification Search
CPC .. G05D 1/0214; G05D 1/0088; G05D 1/0223; G05D 1/0289; G05D 1/0227;
(Continued)

(56) References Cited

U.S. PATENT DOCUMENTS

2010/0256852 A1\* 10/2010 Mudalige ............... G08G 1/164
701/24
2012/0123641 A1\*  5/2012 Ferrin .................. G05D 1/0227
701/41
(Continued)

FOREIGN PATENT DOCUMENTS

CN         111580542 A  \*  8/2020
JP        2008-234404 A    10/2008
(Continued)

OTHER PUBLICATIONS

Machine Translation: WO-2004008266-A1 (Year: 2004).\*
Machine Translation: CN-111580542-A (Year: 2020).\*

*Primary Examiner* — Anne Marie Antonucci
*Assistant Examiner* — Connor L Knight
(74) *Attorney, Agent, or Firm* — Sughrue Mion, PLLC (57) ABSTRACT

An unmanned following vehicle includes a controller that controls the unmanned following vehicle to move in parallel with a moving object by following the moving object on a left side or a right side of the moving object. For example, the controller adjusts a moving speed of the unmanned following vehicle according to a Y-axis coordinate difference value, which is a difference value between a position of the moving object and a position of the unmanned following vehicle in a forward direction. The controller also adjusts a steering direction and a steering angle of the unmanned following vehicle according to an X-axis coordinate difference value, which is a difference value between the position of the moving object and the position of the unmanned following vehicle in a lateral direction.

5 Claims, 8 Drawing Sheets (51) Int. Cl.
*B62D 15/02* (2006.01)
*F41H 7/00* (2006.01)
*G06K 9/00* (2022.01)
*G06V 20/56* (2022.01)

(52) U.S. Cl.
CPC ......... *G05D 1/0088* (2013.01); *G05D 1/0223* (2013.01); *G05D 1/0289* (2013.01); *G06V 20/56* (2022.01)

(58) Field of Classification Search
CPC ......... G05D 2201/0209; G05D 1/0295; G05D 1/0293; G05D 1/0287; G05D 1/0291; G05D 1/0027; G05D 1/12; G05D 1/08; B62D 15/021; F41H 7/005; G06V 20/56; B25J 11/00; B25J 9/161; B25J 9/1664; B25J 9/1697; G08G 1/22; B60W 30/165; B60W 30/16; B60W 2554/80
See application file for complete search history.

(56) References Cited

U.S. PATENT DOCUMENTS

| | | | |
|---|---|---|---|
| 2014/0100734 A1* | 4/2014 | Yamashiro | G08G 1/22 701/23 |
| 2015/0025708 A1* | 1/2015 | Anderson | G01S 13/867 340/463 |
| 2017/0147005 A1* | 5/2017 | Ramm | G05D 1/0295 |
| 2019/0187241 A1* | 6/2019 | Jaeger | G01S 19/51 |
| 2019/0196474 A1* | 6/2019 | Qian | G05D 1/027 |

FOREIGN PATENT DOCUMENTS

| | | |
|---|---|---|
| KR | 10-0612858 B1 | 8/2006 |
| KR | 10-1486308 B1 | 2/2015 |
| KR | 10-1605994 B1 | 3/2016 |
| WO | WO-2004008266 A1 * | 1/2004 ............ G05D 1/104 |

* cited by examiner

UNMANNED FOLLOWING VEHICLE

CROSS-REFERENCE TO THE RELATED APPLICATION

This application is based on and claims priority under 35 U.S.C. § 119 to Korean Patent Application No. 10-2020-0143868, filed on Oct. 30, 2020, in the Korean Intellectual Property Office, the disclosure of which is incorporated by reference herein in its entirety.

BACKGROUND

1. Field

One or more embodiments of the present disclosure relate to an unmanned following vehicle, and more particularly, to an unmanned following vehicle that follows a moving object.

2. Description of Related Art

An unmanned following vehicle can follow a moving object, such as a person or a vehicle, through autonomous driving.

Figure 1:
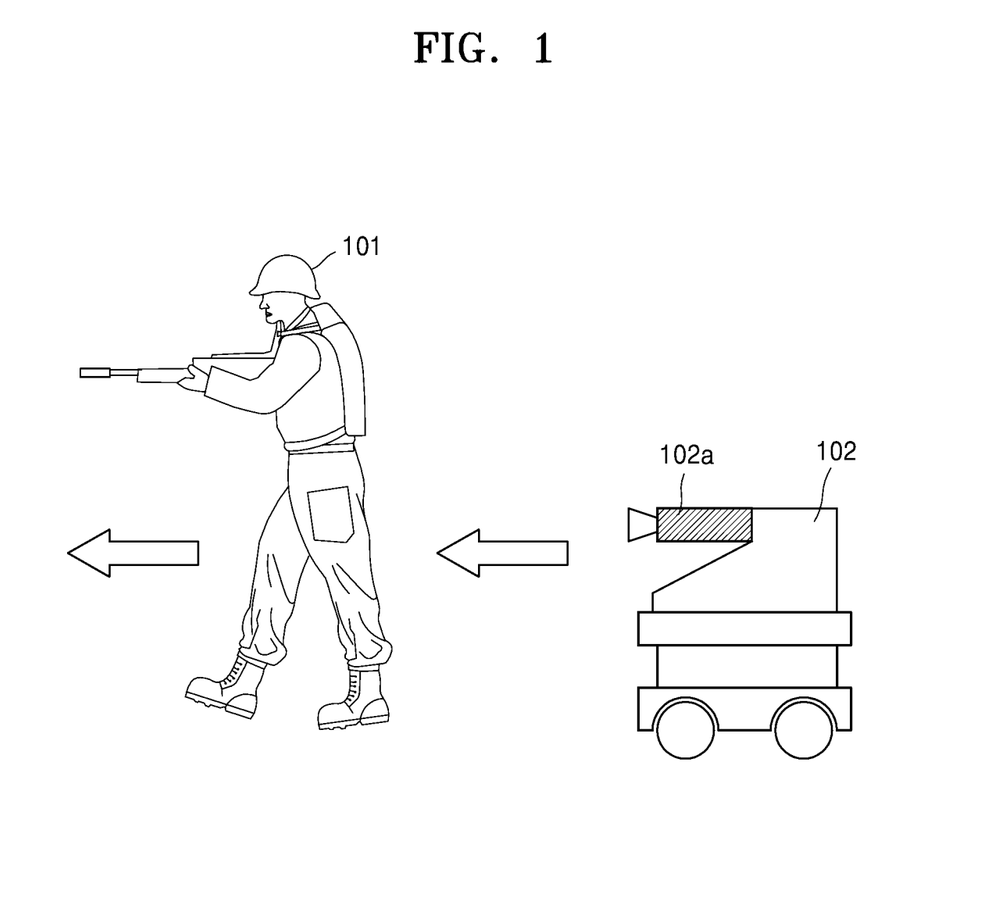
FIG. 1 is a diagram showing a following system using a conventional unmanned following vehicle.

FIG. 1 is a diagram showing a following system using a conventional unmanned following vehicle 102. Reference numeral 102a in FIG. 1 denotes an image capturing unit of the unmanned following vehicle 102.

Referring to FIG. 1, the unmanned following vehicle 102 follows a moving object 101 and controls a following speed to maintain a reference distance to the moving object 101.

Such a typical unmanned following vehicle 102 has the following problems.

First, when the unmanned following vehicle 102 suddenly starts operating due to an abnormal cause, the unmanned following vehicle 102 may collide with the moving object 101.

Second, since it is difficult for the moving object 101 to often check the situation of the unmanned following vehicle 102, the moving object 101 is unable to handle emergency situations of the unmanned following vehicle 102 due to causes like a failure.

The above-described problems of the related art represent technical information possessed by the inventor to derive embodiments of the present disclosure or acquired during the process of deriving the present disclosure and may not necessarily be known technology disclosed to the general public before the application of the present disclosure.

SUMMARY

One or more embodiments of the present disclosure provide an unmanned following vehicle that follows a moving object like a person or vehicle by autonomous driving, wherein the unmanned following vehicle may eliminate the possibility of collision with the moving object and may be frequently checked by the moving object.

Additional aspects will be set forth in part in the description which follows and, in part, will be apparent from the description, or may be learned by practice of the presented embodiments of the disclosure.

According to one or more embodiments, an unmanned following vehicle is provided. The unmanned following vehicle includes: a controller configured to control the unmanned following vehicle to move in parallel with a moving object by following the moving object on a left side or a right side of the moving object, wherein the controller is configured to control the unmanned following vehicle to move in parallel with the moving object by: adjusting a moving speed of the unmanned following vehicle according to a Y-axis coordinate difference value, which is a difference value between a position of the moving object and a position of the unmanned following vehicle in a forward direction, and adjusting a steering direction and a steering angle of the unmanned following vehicle according to an X-axis coordinate difference value, which is a difference value between the position of the moving object and the position of the unmanned following vehicle in a lateral direction.

According to an embodiment, the controller is further configured to adjust a distance between the moving object and the unmanned following vehicle according to whether a Z-axis coordinate difference value, which is a difference value between the position of the moving object and the position of the unmanned following vehicle in a vertical direction, is changed.

According to an embodiment, the controller is further configured to: based on the Z-axis coordinate difference value being increased for a first predetermined time period, control the unmanned following vehicle to increase the distance by a first predetermined value, and based on the Z-axis coordinate difference value being decreased for a second predetermined time period, control the unmanned following vehicle to decrease the distance by a second predetermined value.

According to an embodiment, the controller is further configured to: determine the Y-axis coordinate difference value by subtracting a Y-axis coordinate value of the unmanned following vehicle from a Y-axis coordinate value of the moving object, control the unmanned following vehicle to move forward based on the Y-axis coordinate difference value being positive and an absolute value thereof being greater than a reference value, control the unmanned following vehicle to move backward based on the Y-axis coordinate difference value being negative and an absolute value thereof being greater than the reference value, and control the unmanned following vehicle to move forward or backward at a speed proportional to the absolute value of the Y-axis coordinate difference value.

According to an embodiment, the controller is further configured to: in a case where the unmanned following vehicle follows the moving object from a left side of the moving object, determine the X-axis coordinate difference value by subtracting an X-axis coordinate value of the unmanned following vehicle from an X-axis coordinate value of the moving object, and in a case where the unmanned following vehicle follows the moving object from a right side of the moving object, determine the X-axis coordinate difference value by subtracting the X-axis coordinate value of the moving object from the X-axis coordinate value of the unmanned following vehicle.

According to an embodiment, the controller is further configured to control the unmanned following vehicle to follow the moving object only while the X-axis coordinate difference value is greater than a first reference value and less than a second reference value.

According to an embodiment, the controller is further configured to: based on a Z-axis coordinate difference value, which is a difference value between the position of the moving object and the position of the unmanned following vehicle in a vertical direction, being increased for a first predetermined time period, increase the first reference value by a first predetermined value, and based on the Z-axis coordinate difference value being decreased for a second predetermined time period, reduce the first reference value by a second predetermined value.

According to an embodiment, the controller is further configured to: based on the X-axis coordinate difference value being changed from being less than or equal to the first reference value to being greater than the first reference value, such that the X-axis coordinate difference value is greater than the first reference value for a first time period longer than a first reference time period, control the unmanned following vehicle to start following the moving object, based on the X-axis coordinate difference value being changed from being greater than the first reference value to being less than or equal to the first reference value, such that the X-axis coordinate difference value is less than or equal to the first reference value for a second time period longer than a second reference time period, control the unmanned following vehicle to stop following the moving object, based on the X-axis coordinate difference value being changed from being greater than or equal to the second reference value to being less than the second reference value, such that the X-axis coordinate difference value is less than the second reference value for a third time period longer than a third reference time period, control the unmanned following vehicle to start following the moving object, and based on the X-axis coordinate difference value being changed from being less than the second reference value to being equal to or greater than the second reference value, such that the X-axis coordinate difference value is equal to or greater than the second reference value for a fourth time period longer than a fourth reference time period, control the unmanned following vehicle to stop following the moving object.

According to an embodiment, the controller is further configured to: set a third reference value to be greater than the first reference value, set a fourth reference value to be greater than the third reference value and less than the second reference value, control the unmanned following vehicle to move forward or backward based on the X-axis coordinate difference value being greater than the third reference value and less than the fourth reference value, and control the unmanned following vehicle to make a left turn or a right turn toward a moving direction of the moving object based on the X-axis coordinate difference value being greater than the first reference value and less than the third reference value, or based on the X-axis coordinate difference value being greater than or equal to the fourth reference value and less than the second reference value.

According to an embodiment, in a case where the unmanned following vehicle follows the moving object from the left side of the moving object, the controller is configured to: based on the X-axis coordinate difference value being greater than the first reference value and less than or equal to the third reference value, increase an angle of the left turn as the X-axis coordinate difference value becomes smaller, and based on the X-axis coordinate difference value being greater than or equal to the fourth reference value and less than the second reference value, increase an angle of the right turn as the X-axis coordinate difference value becomes larger.

According to an embodiment, in a case where the unmanned following vehicle follows the moving object from the right side of the moving object, the controller is configured to: based on the X-axis coordinate difference value being greater than the first reference value and less than or equal to the third reference value, increase an angle of the right turn as the X-axis coordinate difference value becomes smaller, and based on the X-axis coordinate difference value being greater than or equal to the fourth reference value and less than the second reference value, increase an angle of the left turn as the X-axis coordinate difference value becomes larger.

According to an embodiment, the unmanned following vehicle further includes: a rotary reel configured to elastically provide a string connected to the moving object; a first encoder configured to measure a length of the string, as the X-axis coordinate difference value, while rotating along with the rotary reel; a second encoder configured to measure a horizontal angle of the string, as the Y-axis coordinate difference value, while rotating according to a change in a horizontal position of the string connected to the moving object; and a third encoder configured to measure a vertical angle of the string. as the Z-axis coordinate difference value. while rotating according to a change in a vertical position of the string connected to the moving object, wherein the controller is further configured to control movement of the unmanned following vehicle according to measurement results of the first encoder, the second encoder, and the third encoder.

According to an embodiment, based on the horizontal angle of the string being positive, in the forward direction, and an absolute value thereof being greater than a first reference value, the controller is further configured to perform forward moving control, and based on the horizontal angle of the string being negative, in a backward direction, and an absolute value thereof being greater than a second reference value, the controller is further configured to perform backward moving control.

According to an embodiment, the unmanned following vehicle further includes ultra-wideband (UWB) sensor-receivers installed at different locations, wherein the controller is further configured to control movement of the unmanned following vehicle according to respective signals of the UWB sensor-receivers, and wherein the controller is further configured to: calculate distances between respective ones of the UWB sensor-receivers and an UWB sensor-transmitter provided at the moving object, calculate X-axis coordinates, Y-axis coordinates, and Z-axis coordinates of the moving object based on the distances obtained, and calculate the Y-axis coordinate difference value, the X-axis coordinate difference value, and the Z-axis coordinate difference value based on the distances obtained.

According to one or more embodiments, a method performed by a controller including at least one processor is provided. The method includes controlling an unmanned following vehicle to move in parallel with a moving object by following the moving object on a left side or a right side of the moving object by: controlling a moving speed of the unmanned following vehicle according to a Y-axis coordinate difference value, which is a difference value between a position of the moving object and a position of the unmanned following vehicle in a forward direction, and controlling a steering direction and a steering angle of the unmanned following vehicle according to an X-axis coordinate difference value, which is a difference value between the position of the moving object and the position of the unmanned following vehicle in a lateral direction.

According to an embodiment, the method further includes adjusting a distance between the moving object and the unmanned following vehicle based on a change of a Z-axis coordinate difference value, which is a difference value between the position of the moving object and the position of the unmanned following vehicle in a vertical direction.

According to an embodiment, the method further includes determining the Y-axis coordinate difference value by subtracting a Y-axis coordinate value of the unmanned following vehicle from a Y-axis coordinate value of the moving object.

According to an embodiment, the method further includes determining the X-axis coordinate difference value by subtracting an X-axis coordinate value of the unmanned following vehicle from an X-axis coordinate value of the moving object, or determining the X-axis coordinate difference value by subtracting the X-axis coordinate value of the moving object from the X-axis coordinate value of the unmanned following vehicle.

According to an embodiment, the controlling the unmanned following vehicle to follow the moving object includes controlling the unmanned following vehicle to follow the moving object based on the X-axis coordinate difference value being greater than a first reference value and less than a second reference value.

According to one or more embodiments, a non-transitory computer-readable medium storing computer code is provided. The computer code is configured to, when executed by at least one processor, cause the at least one processor to control an unmanned following vehicle to move in parallel with a moving object by following the moving object on a left side or a right side of the moving object by: controlling a moving speed of the unmanned following vehicle according to a Y-axis coordinate difference value, which is a difference value between a position of the moving object and a position of the unmanned following vehicle in a forward direction, and controlling a steering direction and a steering angle of the unmanned following vehicle according to an X-axis coordinate difference value, which is a difference value between the position of the moving object and the position of the unmanned following vehicle in a lateral direction.

An unmanned following vehicle according to embodiments of the present disclosure follows a moving object from the left side or the right side of the moving object by using a Y-axis coordinate difference value and an X-axis coordinate difference value.

Therefore, compared to a conventional unmanned following vehicle that follows a moving object behind the moving object, the following effects may be expected.

First, even when the unmanned following vehicle suddenly starts operating due to an abnormal cause, the unmanned following vehicle will not collide with the moving object.

Second, since the moving object may often check the situation of the unmanned following vehicle, the moving object may handle emergency situations of the unmanned following vehicle due to causes like a failure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

The following description and the accompanying drawings are intended to describe the operation according to one or more embodiments, and parts that may be easily implemented by one of ordinary skill in the art, without explicit description, may be omitted.

The terms used in this specification should be interpreted as meanings and concepts consistent with the technical spirit of one or more embodiments of the present disclosure in order to best represent the one or more embodiments.

Hereinafter, one or more embodiments will be described in detail with reference to the accompanying drawings.

Figure 2:
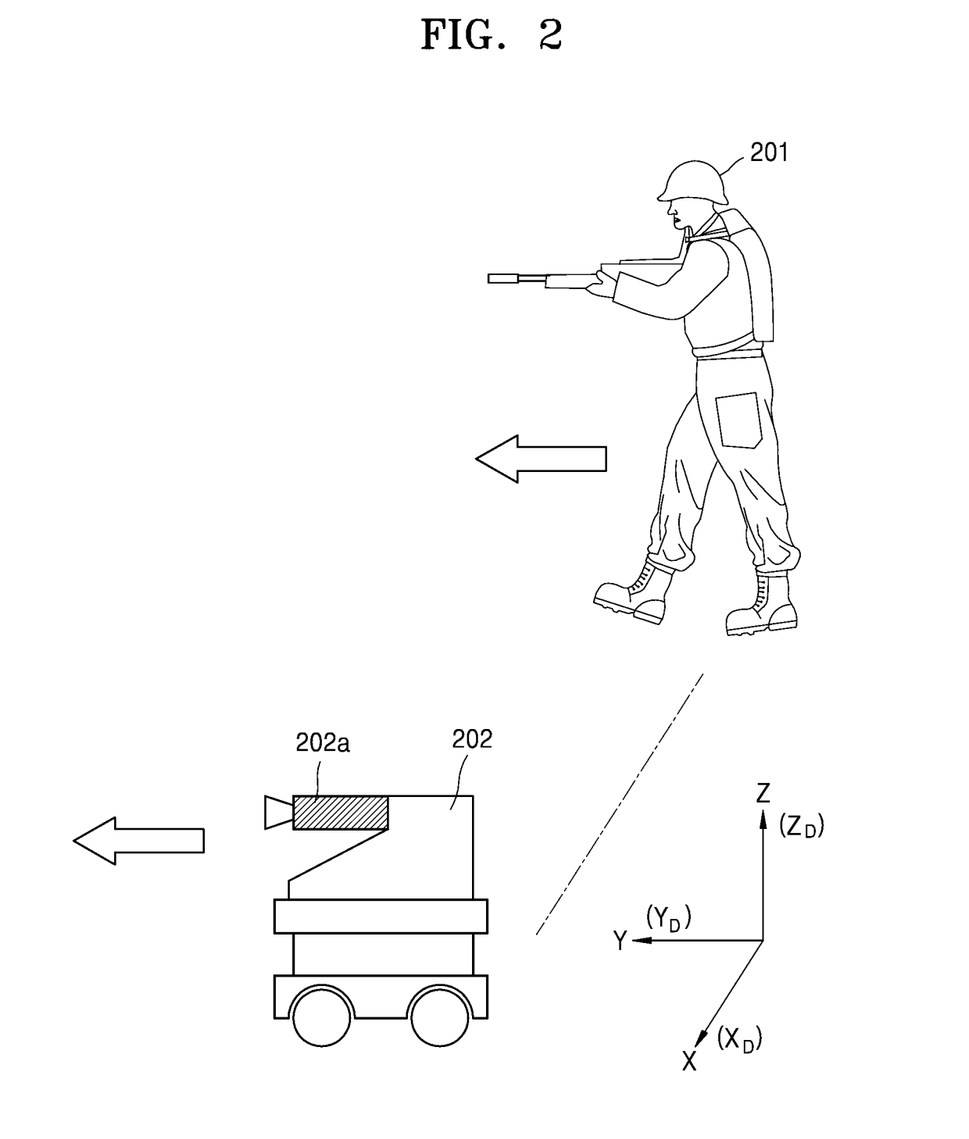
FIG. 2 is a diagram showing a following system using an unmanned following vehicle according to one or more embodiments.

FIG. 2 is a diagram showing a following system by an unmanned following vehicle 202 according to one or more embodiments. Reference numeral 202a in FIG. 2 denotes an image capturing unit of the unmanned following vehicle 202.

Referring to FIG. 2, the unmanned following vehicle 202 of the present embodiment moves in parallel with a moving object 201 by following the moving object 201 on the left side or the right side of the moving object 201. A moving speed is controlled according to a Y-axis coordinate difference value $Y_D$, which is a difference value between positions of the moving object 201 and the unmanned following vehicle 202 in a forward direction Y. A steering direction and a steering angle are controlled according to an X-axis coordinate difference value $X_D$, which is a difference value between positions of the moving object 201 and the unmanned following vehicle 202 in a lateral direction X.

In other words, the unmanned following vehicle 202 of the present embodiment follows the moving object 201 from the left side or the right side of the moving object 201 by using the Y-axis coordinate difference value $Y_D$ and the X-axis coordinate difference value $X_D$. Therefore, compared to a conventional unmanned following vehicle that follows the moving object 201 behind the moving object 201, the following effects may be expected.

First, even when the unmanned following vehicle 202 suddenly starts operating due to an abnormal cause, the unmanned following vehicle 202 does not collide with the moving object 201.

Second, since the moving object 201 may often check the situation of the unmanned following vehicle 102, the moving object 201 may handle emergency situations of the unmanned following vehicle 102 due to causes like a failure.

On the other hand, depending on whether a Z-axis coordinate difference value $Z_D$, which is a difference value between positions of the moving object 201 and the unmanned following vehicle 202 in a vertical direction Z, is changed, a distance between the moving object 201 and the unmanned following vehicle 202 is adjusted. In other words, the minimum X-axis coordinate difference value $X_D$ that the unmanned following vehicle 202 is capable of moving straight forward without turning left or right is adjusted.

In the present embodiment, when the Z-axis coordinate difference value $Z_D$ is increased for a predetermined time period, the distance is increased by a predetermined value. Also, when the Z-axis coordinate difference value $Z_D$ is decreased for a predetermined time period, the distance is decreased by a predetermined value. Therefore, the moving object 201 may adjust the distance by changing its height. Thus, the distance may be quickly adjusted.

For example, when a soldier, as the moving object 201, raises and then drops a heel, the distance is increased by a predetermined value. Also, when the soldier sits down slightly and then stands up, the distance is decreased by a predetermined value. Of course, opposite embodiments may also be applied.

Figure 3:
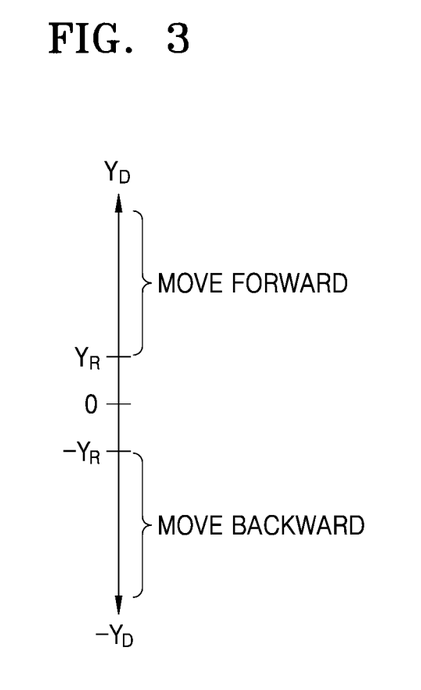
FIG. 3 is a diagram for describing that the unmanned following vehicle in FIG. 2 controls its moving speed according to a Y-axis coordinate difference value.

FIG. 3 is a diagram for describing that the unmanned following vehicle 202 in FIG. 2 controls its moving speed according to the Y-axis coordinate difference value $Y_D$. Detailed descriptions thereof will be given below with reference to FIGS. 2 and 3.

The Y-axis coordinate difference value $Y_D$ is a result of subtracting the Y-axis coordinate value of the unmanned following vehicle 202 from the Y-axis coordinate value of the moving object 201.

The unmanned following vehicle 202 moves forward when the Y-axis coordinate difference value $Y_D$ is a positive number and its absolute value is greater than a reference value $Y_R$, moves backward when the Y-axis coordinate difference value $Y_D$ is a negative number and its absolute value is greater than the reference value $Y_R$, wherein the unmanned following vehicle 202 moves forward or backward at a speed proportional to the absolute value of the Y-axis coordinate difference value $Y_D$.

Figure 4:
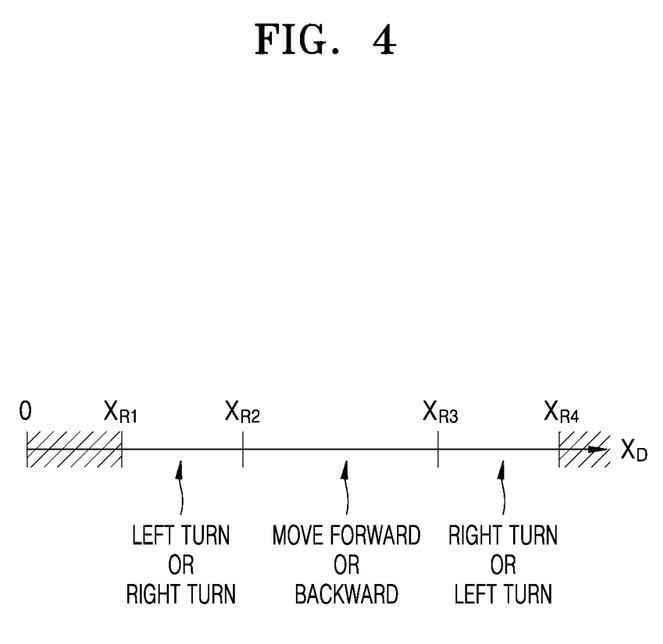
FIG. 4 is a diagram for describing that the unmanned following vehicle in FIG. 2 controls a steering direction and a steering angle according to an X-axis coordinate difference value $X_D$.
Figure 5:
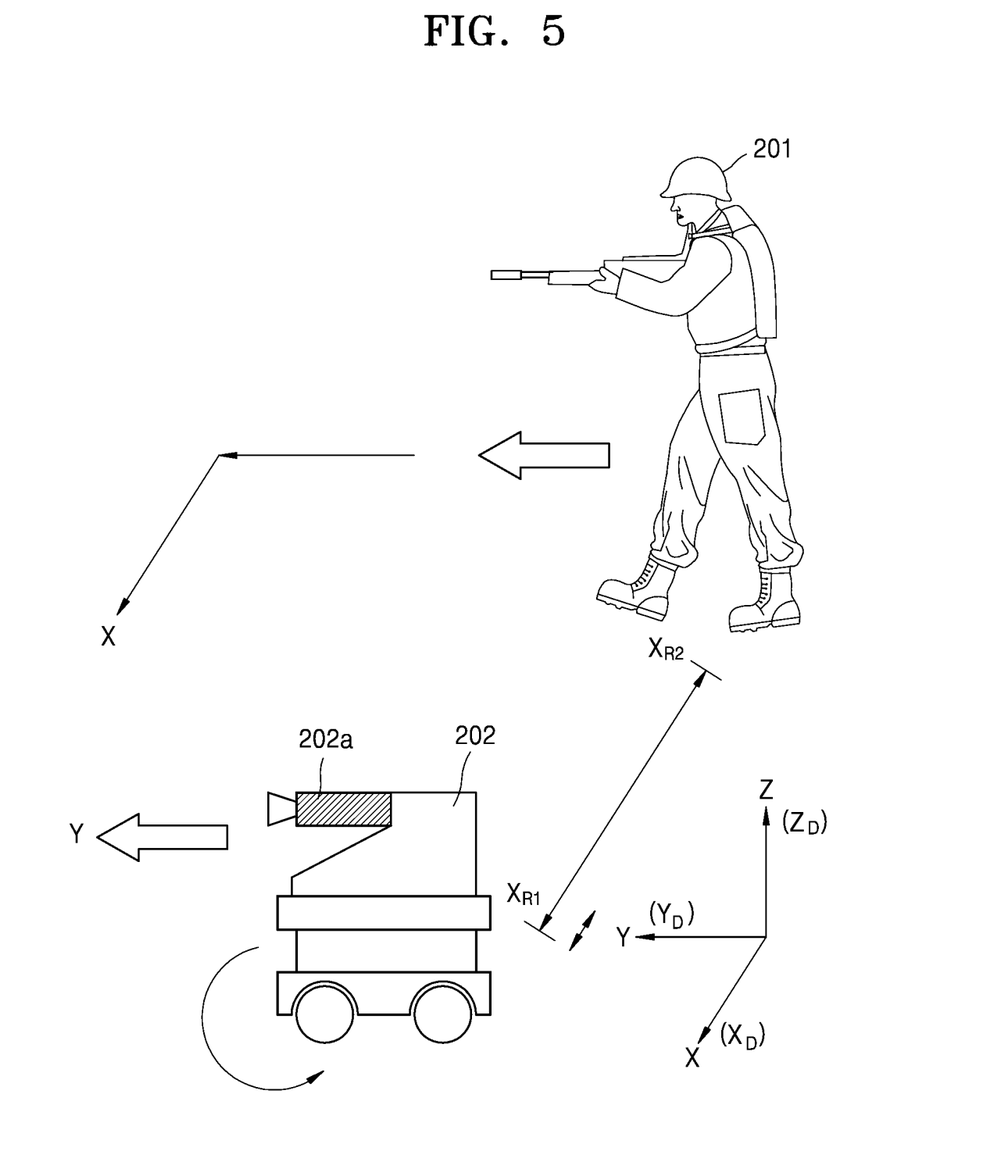
FIG. 5 is a diagram showing a case where the moving object turns left while the unmanned following vehicle in FIG. 2 is following the moving object from the left side of the moving object.

FIG. 4 is a diagram for describing that the unmanned following vehicle 202 in FIG. 2 controls a steering direction and a steering angle according to the X-axis coordinate difference value $X_D$. FIG. 5 shows a case where the moving object turns left while the unmanned following vehicle 202 in FIG. 2 is following the moving object 201 from the left side of the moving object 201.

In FIG. 4, $X_D$ denotes an X-axis coordinate difference value, $X_{R1}$ denotes a first reference value, $X_{R2}$ denotes a second reference value, $X_{R3}$ denotes a third reference value, and $X_{R4}$ denotes a fourth reference value. Controlling of a steering direction and a steering angle will be described below with reference to FIGS. 2, 4, and 5.

When the unmanned following vehicle 202 follows the moving object 201 from the left side of the moving object 201, the X-axis coordinate difference value $X_D$ is a result of subtracting an X-axis coordinate value of the unmanned following vehicle 202 from an X-axis coordinate value of the moving object 201. On the contrary, when the unmanned following vehicle 202 follows the moving object 201 from the right side of the moving object 201, the X-axis coordinate difference value $X_D$ is a result of subtracting an X-axis coordinate value of the moving object 201 from an X-axis coordinate value of the unmanned following vehicle 202. By setting in this way, calculation may be performed only in a positive number range.

Figure 6:
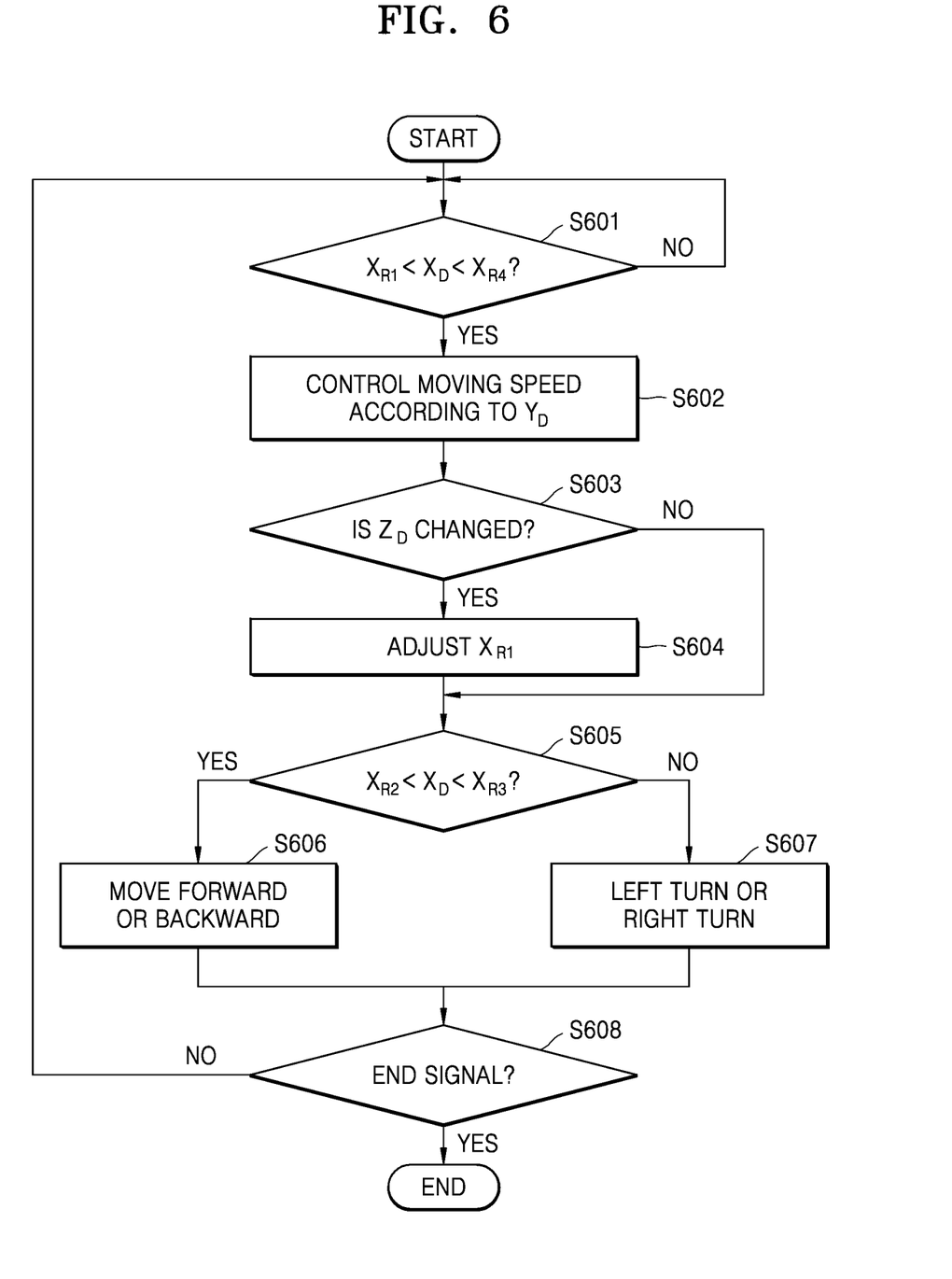
FIG. 6 is a diagram showing major operations of the unmanned following vehicle in FIG. 2.

The unmanned following vehicle 202 follows the moving object 201 only while the X-axis coordinate difference value $X_D$ is greater than the first reference value $X_{R1}$ and less than the fourth reference value $X_{R4}$ (refer to operation S601 of FIG. 6). Four operations therefor will be described in detail.

First, while the X-axis coordinate difference value $X_D$ is being changed from a state less than or equal to the first reference value $X_{R1}$ to a state greater than the first reference value $X_{R1}$, when the X-axis coordinate difference $X_D$ is greater than the first reference value $X_{R1}$ for a time period longer than a reference time period, the unmanned following vehicle 202 starts following the moving object 201.

Second, while the X-axis coordinate difference value $X_D$ is being changed from a state greater than the first reference value $X_{R1}$ to a state equal to or less than the first reference value $X_{R1}$, when the X-axis coordinate difference $X_D$ is less than the first reference value $X_{R1}$ for a time period longer than a reference time period, the unmanned following vehicle 202 stops following the moving object 201.

Third, while the X-axis coordinate difference value $X_D$ is being changed from a state equal to or greater than the fourth reference value $X_{R4}$ to a state less than the fourth reference value $X_{R4}$, when the X-axis coordinate difference $X_D$ is less than the fourth reference value $X_{R4}$ for a time period longer than a reference time period, the unmanned following vehicle 202 starts following the moving object 201.

Fourth, while the X-axis coordinate difference value $X_D$ is being changed from a state less than the fourth reference value $X_{R4}$ to a state equal to or greater than the fourth reference value $X_{R4}$, when the X-axis coordinate difference $X_D$ is equal to or greater than the first reference value $X_{R4}$ for a time period longer than a reference time period, the unmanned following vehicle 202 stops following the moving object 201.

As the first reference value $X_{R1}$ is applied as described above, the distance between the moving object 201 and the unmanned following vehicle 202 may be adjusted to not become smaller than the first reference value $X_{R1}$.

The unmanned following vehicle 202 increases the first reference value $X_{R1}$ by a predetermined value when the Z-axis coordinate difference value $Z_D$, which is the difference value between positions of the moving object 201 and the unmanned following vehicle 202 in the vertical direction, is increased for a predetermined time period. Also, the unmanned following vehicle 202 decreases the first reference value $X_{R1}$ by a predetermined value when the Z-axis coordinate difference value $Z_D$ is decreased for a predetermined time period. Therefore, the moving object 201 may adjust the distance in the X-axis direction by changing its height. Thus, the distance may be quickly adjusted. For example, when a soldier, as the moving object 201, raises and then drops a heel, the distance is increased by a predetermined value. Also, when the soldier sits down slightly and then stands up, the distance is decreased by a predetermined value. Of course, opposite embodiments may also be applied.

Meanwhile, the second reference value $X_{R2}$ that is greater than the first reference value $X_{R1}$ is set, and the third reference value $X_{R3}$ that is greater than the second reference value $X_{R2}$ and less than the fourth reference value $X_{R4}$ is set.

The unmanned following vehicle 202 moves forward or backward while the X-axis coordinate difference value $X_D$ is greater than the second reference value $X_{R2}$ and less than the third reference value $X_{R3}$.

The unmanned following vehicle 202 performs a left turn or a right turn toward the moving direction of the moving object 201 while the X-axis coordinate difference value $X_D$ is greater than the first reference value $X_{R1}$ and equal to or less than the second reference value $X_{R2}$.

The unmanned following vehicle 202 performs a right turn or a left turn toward the moving direction of the moving object 201 while the X-axis coordinate difference value $X_D$ is equal to or greater than the third reference value $X_{R3}$ and less than the fourth reference value $X_{R4}$.

In detail, when the unmanned following vehicle 202 is following the moving object from the left side of the moving object 201 (in the case of FIG. 5), while the X-axis coordinate difference value $X_D$ is greater than the first reference value $X_{R1}$ and less than or equal to the second reference value $X_{R2}$, the smaller the X-axis coordinate difference value $X_D$ is, the greater the angle of a left turn becomes. Also, while the X-axis coordinate difference value $X_D$ is equal to or greater than the third reference value $X_{R3}$ and less than the fourth reference value $X_{R4}$, the greater the X-axis coordinate difference value $X_D$ is, the greater the angle of a right turn becomes.

On the contrary, when the unmanned following vehicle 202 is following the moving object from the right side of the moving object 201, while the X-axis coordinate difference value $X_D$ is greater than the first reference value $X_{R1}$ and less than or equal to the second reference value $X_{R2}$, the smaller the X-axis coordinate difference value $X_D$ is, the greater the angle of a right turn becomes. Also, while the X-axis coordinate difference value $X_D$ is equal to or greater than the third reference value $X_{R3}$ and less than the fourth reference value $X_{R4}$, the greater the X-axis coordinate difference value $X_D$ is, the greater the angle of a left turn becomes.

FIG. 6 is a diagram showing major operations of the unmanned following vehicle 202 in FIG. 2. The major operations of FIG. 6 will be described below with reference to FIGS. 2 to 6.

The unmanned following vehicle 202 follows the moving object 201 only while the X-axis coordinate difference value $X_D$ is greater than the first reference value $X_{R1}$ and less than the fourth reference value $X_{R4}$ (operation S601). The four operations therefor have been described above. As the first reference value $X_{R1}$ is applied as described above, the distance between the moving object 201 and the unmanned following vehicle 202 may be adjusted to not to become smaller than the first reference value $X_{R1}$.

A moving speed is controlled according to a Y-axis coordinate difference value $Y_D$, which is a difference value between positions of the moving object 201 and the unmanned following vehicle 202 in a forward direction Y (operation S602). The unmanned following vehicle 202 moves forward when the Y-axis coordinate difference value $Y_D$ is a positive number and its absolute value is greater than a reference value $Y_R$, moves backward when the Y-axis coordinate difference value $Y_D$ is a negative number and its absolute value is greater than the reference value $Y_R$, wherein the unmanned following vehicle 202 moves forward or backward at a speed proportional to the absolute value of the Y-axis coordinate difference value $Y_D$ (refer to FIG. 3).

The unmanned following vehicle 202 adjusts the first reference value $X_{R1}$ according to a change in a Z-axis coordinate difference value $Z_D$, which is a difference value between positions of the moving object 201 and the unmanned following vehicle 202 in the vertical direction (operation S603 and operation S604). Therefore, the moving object 201 may adjust the distance in the X-axis direction by changing its height. Thus, the distance may be quickly adjusted. For example, when a soldier, as the moving object 201, raises and then drops a heel, the distance is increased by a predetermined value. Also, when the soldier sits down slightly and then stands up, the distance is decreased by a predetermined value. Of course, opposite embodiments may also be applied.

The unmanned following vehicle 202 moves forward or backward while the X-axis coordinate difference value $X_D$ is greater than the second reference value $X_{R2}$ and less than the third reference value $X_{R3}$ (operation S605 and operation S606).

The unmanned following vehicle 202 performs a left turn or a right turn toward the moving direction of the moving object 201 while the X-axis coordinate difference value $X_D$ is greater than the first reference value $X_{R1}$ and equal to or less than the second reference value $X_{R2}$. Also, the unmanned following vehicle 202 performs a right turn or a left turn toward the moving direction of the moving object 201 while the X-axis coordinate difference value $X_D$ is equal to or greater than the third reference value $X_{R3}$ and less than the fourth reference value $X_{R4}$ (operation S605 and operation S607).

Operations S605 to S607 have been described in detail above. Operations S601 to S607 are repeatedly performed according to a control cycle until an end signal is generated (operation S608).

Figure 7:
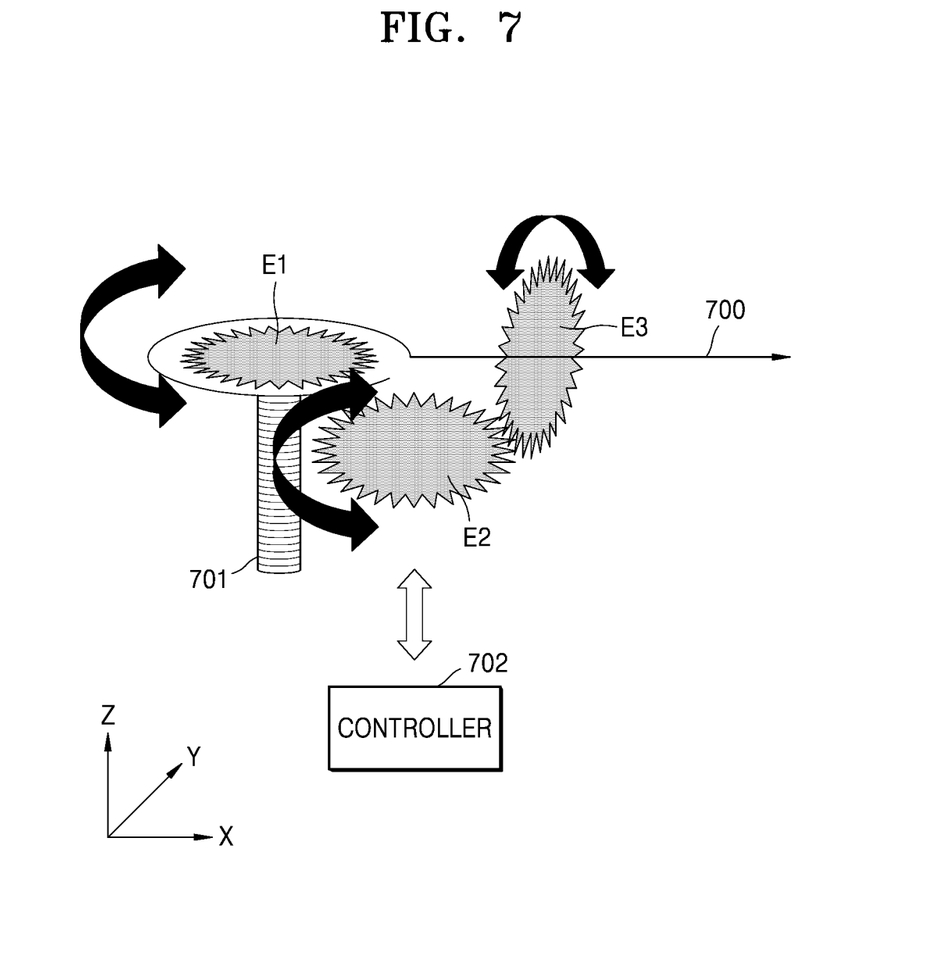
FIG. 7 is a block diagram showing a first example of an unmanned following device included in the unmanned following vehicle in FIG. 2.

FIG. 7 is a diagram showing a first example of an unmanned following device included in the unmanned following vehicle 202 in FIG. 2. Detailed descriptions thereof will be given below with reference to FIGS. 2 and 7.

The unmanned following device provided in the unmanned following vehicle 202 includes a rotary reel 701, a first encoder E1, a second encoder E2, a third encoder E3, and a controller 702. The controller 702 may be included in a main controller of the unmanned following vehicle 202.

The rotary reel 701 elastically provides a string 700 to be connected to the moving object 202. In other words, the rotary reel 701 maintains a winding force in the winding direction of the string 700. When the moving object 202 approaches the unmanned following vehicle 202, the rotary reel 701 winds the string 700. Therefore, the length of the string 700 between the moving object 202 and the unmanned following vehicle 202 is reduced. When the moving object 202 moves away from the unmanned following vehicle 202, the moving object 202 pulls the string 700 stronger than the winding force. Accordingly, as the rotary reel 701 releases the string 700, the length of the string 700 increases.

The first encoder E1, while rotating along with the rotary reel 701, measures the length of the string 700 as the X-axis coordinate difference value $X_D$.

The second encoder E2 measures the horizontal angle of the string 700 as the Y-axis coordinate difference value $Y_D$ while rotating according to a change in the horizontal position of the string 700 connected to the moving object 201.

The third encoder E3 measures the vertical angle of the string 700 as the Z-axis coordinate difference value $Z_D$ while rotating according to a change in the vertical position of the string 700 connected to the moving object 201.

The controller 702 controls the movement of the unmanned following vehicle 202 according to measurement results from the first encoder E1, the second encoder E2, and the third encoder E3. The operation method of FIG. 6 may be used as a control method of the controller 702. However, the length of the string 700 may be applied instead of the X-axis coordinate difference value $X_D$, the horizontal angle of the string 700 may be applied instead of the Y-axis coordinate difference value $Y_D$, and the vertical angle of the string 700 may be applied instead of the Z-axis coordinate difference value $Z_D$.

For example, the controller 702 performs forward moving control when the horizontal angle of the string 700 is a positive angle in the forward direction and the absolute value thereof is greater than a reference value. Also, the controller 702 performs backward moving control when the horizontal angle of the string 700 is a negative angle in the backward direction and the absolute value thereof is greater than the reference value (refer to FIG. 3).

Figure 8:
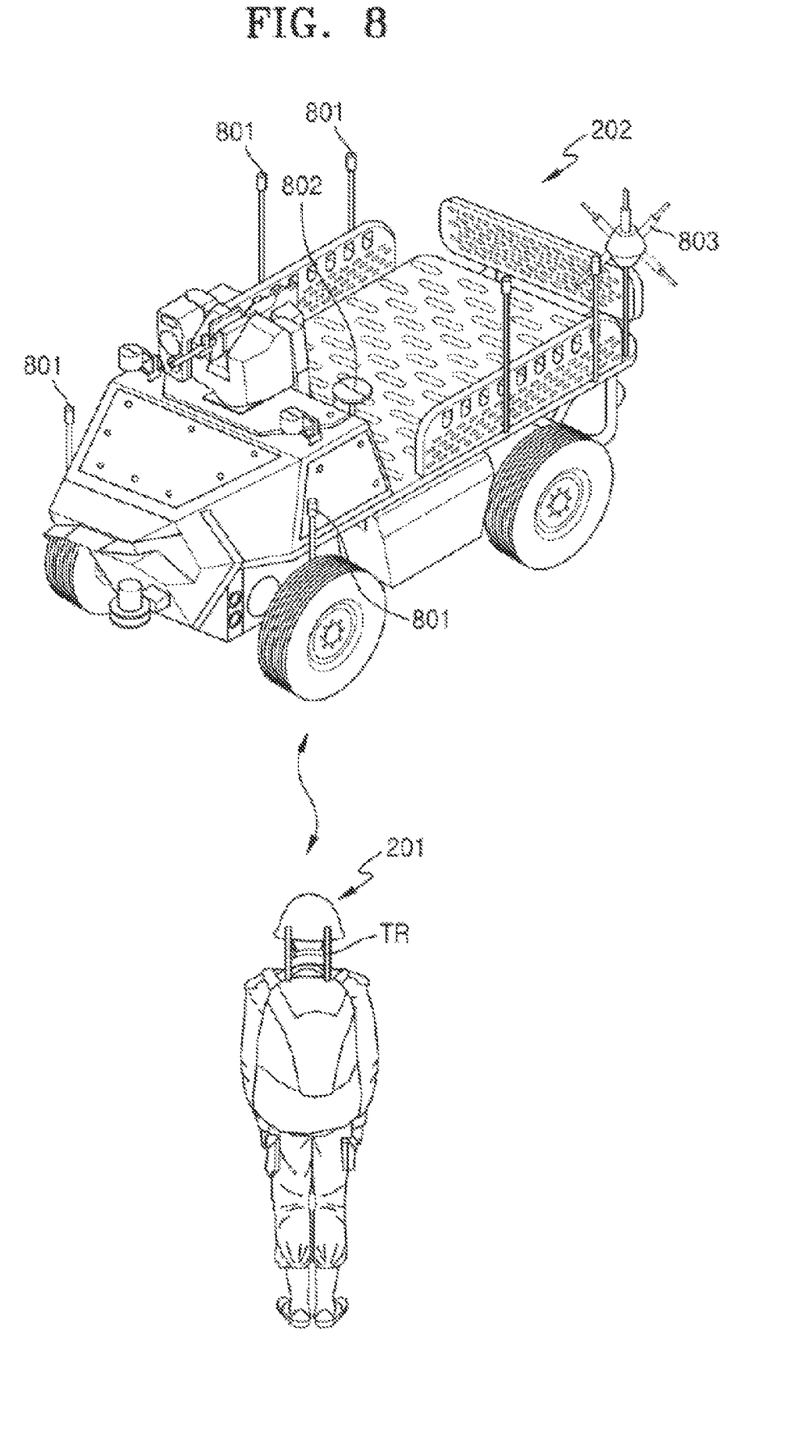
FIG. 8 is a block diagram showing a second example of an unmanned following device included in the unmanned following vehicle in FIG. 2.

FIG. 8 is a diagram showing a second example of an unmanned following device included in the unmanned following vehicle 202 in FIG. 2. In FIG. 8, the reference numeral TR denotes an ultra-wideband (UWB) sensor-transmitter, the reference numeral 801 denotes UWB sensor-receivers, the reference numeral 802 denotes a GPS antenna, and the reference numeral 803 denotes an antenna for wireless communication. Detailed descriptions thereof will be given below with reference to FIGS. 2 and 7.

The unmanned following device included in the unmanned following vehicle 202 includes the UWB sensor-receivers 801 and a controller (not shown). The controller is included in a main controller of the unmanned following vehicle 202. The UWB sensor-receivers 801 are installed at different locations of the unmanned following vehicle 202. The controller controls the movement of the unmanned following vehicle 202 according to signals of the UWB sensor-receivers 801.

The controller obtains respective distances, which are distances between the respective UWB sensor-receivers 801 and the UWB sensor-transmitter TR provided at the moving object 201.

For example, since a transmission signal from the UWB sensor-transmitter TR includes information regarding a transmission time, the controller may obtain respective distances according to transmission times.

Also, the controller obtains Y-axis coordinates, X-axis coordinates, and Z-axis coordinates of the moving object 201 according to the obtained respective distances and calculates the Y-axis coordinate difference value $Y_D$, the X-axis coordinate difference value $X_D$, and the Z-axis coordinate difference value $Z_D$ based on the same. Such a calculation method may be set based on a well-known triangulation method or the like. The operation method of FIG. 6 may be used as a control method of the controller.

As described above, an unmanned following vehicle of embodiments of the present disclosure follows a moving object from the left side or the right side of the moving object by using a Y-axis coordinate difference value and an X-axis coordinate difference value.

Therefore, compared to a conventional unmanned following vehicle that follows a moving object behind the moving object, the following effects may be expected.

First, even when the unmanned following vehicle suddenly starts operating due to an abnormal cause, the unmanned following vehicle does not collide with the moving object.

Second, since the moving object may often check the situation of the unmanned following vehicle, the moving object may handle emergency situations of the unmanned following vehicle due to causes like a failure.

The operations of embodiments of the present disclosure described above, including the operations described with respect to FIGS. 1-8, may be performed by a controller. According to embodiments, the controller may comprise at least one processor and memory storing computer code. The computer code, when executed by the at least one processor, may cause the at least one processor to perform one or more operations of the present disclosure.

At least one of the components, elements, modules or units (collectively "components" in this paragraph) represented by a block in the drawings and/or described in the description, such as a controller, may be embodied as various numbers of hardware, software, and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments. While one or more non-limiting example embodiments have been described with reference to the figures, it will be understood by those of ordinary skill in the art that various changes in form and details may be made therein without departing from the spirit and scope of the disclosure.

What is claimed is:
1. An unmanned following vehicle comprising:
a controller configured to control the unmanned following vehicle to move in parallel with a moving object by following the moving object on a left side or a right side of the moving object, wherein the controller is configured to control the unmanned following vehicle to move in parallel with the moving object by:
  the controller being configured to adjust a moving speed of the unmanned following vehicle according to a Y-axis coordinate difference value, which is a difference value between a position of the moving object and a position of the unmanned following vehicle in a forward direction, and
  the controller being configured to adjust a steering direction and a steering angle of the unmanned following vehicle according to an X-axis coordinate difference value, which is a difference value between the position of the moving object and the position of the unmanned following vehicle in a lateral direction,
wherein the controller is further configured to:
  control the unmanned following vehicle to follow the moving object only while the X-axis coordinate difference value is greater than a first reference value and less than a second reference value,
  based on the X-axis coordinate difference value being changed from being less than or equal to the first reference value to being greater than the first reference value, such that the X-axis coordinate difference value is greater than the first reference value for a first time period longer than a first reference time period, control the unmanned following vehicle to start following the moving object,
  based on the X-axis coordinate difference value being changed from being greater than the first reference value to being less than or equal to the first reference value, such that the X-axis coordinate difference value is less than or equal to the first reference value for a second time period longer than a second reference time period, control the unmanned following vehicle to stop following the moving object,
  based on the X-axis coordinate difference value being changed from being greater than or equal to the second reference value to being less than the second reference value, such that the X-axis coordinate difference value is less than the second reference value for a third time period longer than a third reference time period, control the unmanned following vehicle to start following the moving object, and
  based on the X-axis coordinate difference value being changed from being less than the second reference value to being equal to or greater than the second reference value, such that the X-axis coordinate difference value is equal to or greater than the second reference value for a fourth time period longer than a fourth reference time period, control the unmanned following vehicle to stop following the moving object.

2. An unmanned following vehicle comprising:
a controller configured to control the unmanned following vehicle to move in parallel with a moving object by following the moving object on a left side or a right side of the moving object, wherein
the controller is configured to control the unmanned following vehicle to move in parallel with the moving object by:
  the controller being configured to adjust a moving speed of the unmanned following vehicle according to a Y-axis coordinate difference value, which is a difference value between a position of the moving object and a position of the unmanned following vehicle in a forward direction, and
  the controller being configured to adjust a steering direction and a steering angle of the unmanned following vehicle according to an X-axis coordinate difference value, which is a difference value between the position of the moving object and the position of the unmanned following vehicle in a lateral direction,
wherein the controller is further configured to:
  control the unmanned following vehicle to follow the moving object only while the X-axis coordinate difference value is greater than a first reference value and less than a second reference value,
  set a third reference value to be greater than the first reference value,
  set a fourth reference value to be greater than the third reference value and less than the second reference value,
  control the unmanned following vehicle to move forward or backward based on the X-axis coordinate difference value being greater than the third reference value and less than the fourth reference value, and
  control the unmanned following vehicle to make a left turn or a right turn toward a moving direction of the moving object based on the X-axis coordinate difference value being greater than the first reference value and less than the third reference value, or based on the X-axis coordinate difference value being greater than or equal to the fourth reference value and less than the second reference value.

3. The unmanned following vehicle of claim 2, wherein in a case where the unmanned following vehicle follows the moving object from the left side of the moving object, the controller is configured to:
  based on the X-axis coordinate difference value being greater than the first reference value and less than or equal to the third reference value, increase an angle of the left turn as the X-axis coordinate difference value becomes smaller, and
  based on the X-axis coordinate difference value being greater than or equal to the fourth reference value and less than the second reference value, increase an angle of the right turn as the X-axis coordinate difference value becomes larger.

4. The unmanned following vehicle of claim 2, in a case where the unmanned following vehicle follows the moving object from the right side of the moving object, the controller is configured to:
  based on the X-axis coordinate difference value being greater than the first reference value and less than or equal to the third reference value, increase an angle of the right turn as the X-axis coordinate difference value becomes smaller, and
  based on the X-axis coordinate difference value being greater than or equal to the fourth reference value and less than the second reference value, increase an angle of the left turn as the X-axis coordinate difference value becomes larger.

5. An unmanned following vehicle comprising:
a controller configured to control the unmanned following vehicle to move in parallel with a moving object by following the moving object on a left side or a right side of the moving object, wherein the controller is configured to control the unmanned following vehicle to move in parallel with the moving object by:
- the controller being configured to adjust a moving speed of the unmanned following vehicle according to a Y-axis coordinate difference value, which is a difference value between a position of the moving object and a position of the unmanned following vehicle in a forward direction, and
- the controller being configured to adjust a steering direction and a steering angle of the unmanned following vehicle according to an X-axis coordinate difference value, which is a difference value between the position of the moving object and the position of the unmanned following vehicle in a lateral direction, wherein the unmanned following vehicle further comprises:
- a rotary reel configured to elastically provide a string connected to the moving object,
- a first encoder configured to measure a length of the string, as the X-axis coordinate difference value, while rotating along with the rotary reel;
- a second encoder configured to measure a horizontal angle of the string, as the Y-axis coordinate difference value, while rotating according to a change in a horizontal position of the string connected to the moving object; and
- a third encoder configured to measure a vertical angle of the string as a Z-axis coordinate difference value, which is a difference value between the position of the moving object and the position of the unmanned following vehicle in a vertical direction, while rotating according to a change in a vertical position of the string connected to the moving object, wherein the controller is further configured to:
- control movement of the unmanned following vehicle according to measurement results of the first encoder, the second encoder, and the third encoder,
- adjust a distance between the moving object and the unmanned following vehicle according to whether the Z-axis coordinate difference value is changed,
- based on the horizontal angle of the string being positive, in the forward direction, and an absolute value thereof being greater than a first reference value, the controller is further configured to perform forward moving control, and
- based on the horizontal angle of the string being negative, in a backward direction, and an absolute value thereof being greater than a second reference value, the controller is further configured to perform backward moving control.

* * * * *